(12) United States Patent
Palmer et al.

(10) Patent No.: US 9,663,127 B2
(45) Date of Patent: May 30, 2017

(54) RAIL VEHICLE EVENT DETECTION AND RECORDING SYSTEM

(71) Applicant: SmartDrive Systems, Inc., San Diego, CA (US)

(72) Inventors: Jason Palmer, Carlsbad, CA (US); Slaven Sljivar, San Diego, CA (US); Mark Freitas, San Diego, CA (US); Daniel A. Deninger, San Diego, CA (US); Shahriar Ravari, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 272 days.

(21) Appl. No.: 14/525,416

(22) Filed: Oct. 28, 2014

(65) Prior Publication Data

US 2016/0114820 A1    Apr. 28, 2016

(51) Int. Cl.
*B61L 25/02* (2006.01)
*G07C 5/08* (2006.01)
*G07C 5/00* (2006.01)

(52) U.S. Cl.
CPC ............... *B61L 25/02* (2013.01); *G07C 5/08* (2013.01); *G07C 5/008* (2013.01); *G07C 5/0866* (2013.01)

(58) Field of Classification Search
CPC ........... B61L 25/02; G07C 5/08; G07C 5/008; G07C 5/0866

(Continued)

(56) References Cited

U.S. PATENT DOCUMENTS

| 673,203 A | 4/1901 | Freund |
| 673,795 A | 5/1901 | Hammer |

(Continued)

FOREIGN PATENT DOCUMENTS

| CA | 1126093   | 6/1982 |
| CA | 1126093 A | 6/1982 |

(Continued)

OTHER PUBLICATIONS

DriveCam, Inc.'s Infringement Contentions Exhibit B, U.S. Pat. No. 7,659,827. Aug. 19, 2011. (29 pgs.).

(Continued)

*Primary Examiner* — McDieunel Marc
*Assistant Examiner* — James E Stroud
(74) *Attorney, Agent, or Firm* — Sheppard Mullin Richter & Hampton LLP

(57) ABSTRACT

This disclosure relates to a system and method for detecting and recording rail vehicle events. The system comprises one or more cameras, one or more sensors, non-transient electronic storage, one or more physical computer processors, and/or other components. The one or more cameras may be configured to acquire visual information representing a rail vehicle environment. The one or more sensors may be configured to generate output signals conveying operation information related to operation of the rail vehicle. The non-transient electronic storage may be configured to store electronic information. The one or more physical computer processors may be configured to detect rail vehicle events based on the output signals and facilitate electronic storage of the visual information and the operation information for a period of time that includes the rail vehicle event in the non-transient electronic storage.

23 Claims, 7 Drawing Sheets

(58) Field of Classification Search
USPC .......................................................... 701/19
See application file for complete search history.

(56) References Cited

U.S. PATENT DOCUMENTS

| | | |
|---|---|---|
| 673,907 A | 5/1901 | Johnson |
| 676,075 A | 6/1901 | McDougall |
| 679,511 A | 7/1901 | Richards |
| 681,036 A | 8/1901 | Burg |
| 681,283 A | 8/1901 | Waynick |
| 681,998 A | 9/1901 | Swift |
| 683,155 A | 9/1901 | Thompson |
| 683,214 A | 9/1901 | Mansfield |
| 684,276 A | 10/1901 | Lonergan |
| 685,082 A | 10/1901 | Wood |
| 685,969 A | 11/1901 | Campbell |
| 686,545 A | 11/1901 | Selph |
| 689,849 A | 12/1901 | Brown |
| 691,982 A | 1/1902 | Sturgis |
| 692,834 A | 2/1902 | Davis |
| 694,781 A | 3/1902 | Prinz |
| 2,943,141 A | 6/1960 | Knight |
| 3,634,866 A | 1/1972 | Meyer |
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda et al. |
| 4,489,351 A | 12/1984 | d'Alayer de Costemore |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hutter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhaeuser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van |
| 5,140,436 A | 8/1992 | Blessinger |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,343,527 A | 8/1994 | Moore |
| 5,353,023 A | 10/1994 | Mitsugi |
| 5,361,326 A | 11/1994 | Aparicio |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley |
| 5,445,027 A | 8/1995 | Zoerner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Naether |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,505,076 A | 4/1996 | Parkman |
| 5,513,011 A | 4/1996 | Matsumoto |
| 5,515,285 A | 5/1996 | Garrett |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |

(56) References Cited

U.S. PATENT DOCUMENTS

| | | |
|---|---|---|
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,600,775 A | 2/1997 | King |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van |
| 5,845,733 A | 12/1998 | Wolfsen |
| 5,867,802 A | 2/1999 | Borza |
| 5,877,897 A | 3/1999 | Schofield |
| 5,883,337 A | 3/1999 | Dolan |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,956,664 A | 9/1999 | Bryan |
| 5,959,367 A | 9/1999 | OFarrell |
| 5,978,017 A | 11/1999 | Tino |
| 5,995,881 A | 11/1999 | Kull |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Baque |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |

(56) References Cited

U.S. PATENT DOCUMENTS

| | | |
|---|---|---|
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,526,352 B1 | 2/2003 | Breed |
| 6,529,159 B1 | 3/2003 | Fan |
| 6,535,804 B1 | 3/2003 | Chun |
| 6,552,682 B1 | 4/2003 | Fan |
| 6,553,308 B1 | 4/2003 | Uhlmann |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | De Leon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,027,621 B1 | 4/2006 | Prokoski |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose et al. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,398,140 B2 * | 7/2008 | Kernwein ............... B61L 23/00 246/115 |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,698,028 B1 | 4/2010 | Bilodeau |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,853,376 B2 | 12/2010 | Peng |
| 7,893,958 B1 | 2/2011 | DAgostino |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |

(56) References Cited

U.S. PATENT DOCUMENTS

| | | |
|---|---|---|
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,803,695 B2 | 8/2014 | Denson |
| 8,849,501 B2 | 9/2014 | Cook |
| 8,855,847 B2 | 10/2014 | Uehara |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,296,401 B1 | 3/2016 | Palmer |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters et al. |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0015276 A1 | 1/2004 | Kane |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0138794 A1 | 7/2004 | Saito |
| 2004/0145457 A1 | 7/2004 | Schofield et al. |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0107954 A1 | 5/2005 | Nahla |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |

(56) References Cited

U.S. PATENT DOCUMENTS

| | | |
|---|---|---|
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0183627 A1 | 8/2005 | Hommen |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1 | 9/2005 | Olsen |
| 2005/0205719 A1 | 9/2005 | Hendrickson |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0251337 A1 | 11/2005 | Rajaram |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | DeWaal et al. |
| 2006/0095199 A1 | 5/2006 | Lagassey |
| 2006/0095349 A1 | 5/2006 | Morgan |
| 2006/0098843 A1 | 5/2006 | Chew |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0142913 A1 | 6/2006 | Coffee |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0244830 A1 | 11/2006 | Davenport |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0043487 A1 | 2/2007 | Krzystofczyk |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0216521 A1 | 9/2007 | Guensler |
| 2007/0216771 A1 | 9/2007 | Kumar |
| 2007/0217670 A1* | 9/2007 | Bar-Am .................. B61K 9/08 382/141 |
| 2007/0219685 A1 | 9/2007 | Plante |
| 2007/0219686 A1 | 9/2007 | Plante |
| 2007/0241874 A1 | 10/2007 | Okpysh |
| 2007/0244614 A1 | 10/2007 | Nathanson |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0268158 A1 | 11/2007 | Gunderson |
| 2007/0271105 A1 | 11/2007 | Gunderson |
| 2007/0272116 A1 | 11/2007 | Bartley |
| 2007/0273480 A1 | 11/2007 | Burkman |
| 2007/0279214 A1 | 12/2007 | Buehler |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0143834 A1 | 6/2008 | Comeau |
| 2008/0147267 A1 | 6/2008 | Plante |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0234920 A1 | 9/2008 | Nurminen |
| 2008/0243389 A1 | 10/2008 | Inoue |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard et al. |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff et al. |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2010/0030423 A1 | 2/2010 | Nathanson |
| 2010/0045451 A1 | 2/2010 | Periwal |
| 2010/0049516 A1 | 2/2010 | Talwar |
| 2010/0057342 A1 | 3/2010 | Muramatsu |
| 2010/0063672 A1 | 3/2010 | Anderson |
| 2010/0063680 A1 | 3/2010 | Tolstedt |

(56) References Cited

U.S. PATENT DOCUMENTS

| | | |
|---|---|---|
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0094489 A1 | 4/2010 | Moffitt |
| 2010/0100315 A1 | 4/2010 | Davidson |
| 2010/0104199 A1 | 4/2010 | Zhang |
| 2010/0153146 A1 | 6/2010 | Angell |
| 2010/0157061 A1 | 6/2010 | Katsman |
| 2010/0191411 A1 | 7/2010 | Cook |
| 2010/0204857 A1 | 8/2010 | Forrest |
| 2010/0220892 A1 | 9/2010 | Kawakubo |
| 2010/0241296 A1 | 9/2010 | Rhea |
| 2010/0250020 A1 | 9/2010 | Lee |
| 2010/0250021 A1 | 9/2010 | Cook |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2010/0327125 A1 | 12/2010 | Braband |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0153367 A1 | 6/2011 | Amigo |
| 2011/0161116 A1 | 6/2011 | Peak |
| 2011/0173015 A1 | 7/2011 | Chapman |
| 2011/0213628 A1 | 9/2011 | Peak |
| 2011/0216200 A1 | 9/2011 | Chung |
| 2011/0224891 A1 | 9/2011 | Iwuchukwu |
| 2011/0251752 A1 | 10/2011 | DeLarocheliere |
| 2011/0257882 A1 | 10/2011 | McBurney |
| 2011/0273568 A1 | 11/2011 | Lagassey |
| 2011/0283223 A1 | 11/2011 | Vattinen et al. |
| 2011/0285842 A1 | 11/2011 | Davenport |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0071140 A1 | 3/2012 | Oesterling |
| 2012/0072088 A1 | 3/2012 | Cutright |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0130563 A1* | 5/2012 | McBain ............ B64D 45/0015 701/3 |
| 2012/0134547 A1 | 5/2012 | Jung |
| 2012/0150436 A1 | 6/2012 | Rossano |
| 2012/0190001 A1 | 7/2012 | Knight |
| 2012/0203402 A1* | 8/2012 | Jape .................... B61L 27/0027 701/19 |
| 2012/0210252 A1 | 8/2012 | Fedoseyeva |
| 2012/0245908 A1 | 9/2012 | Berggren |
| 2012/0269383 A1 | 10/2012 | Bobbitt |
| 2012/0277950 A1 | 11/2012 | Plante |
| 2012/0283895 A1 | 11/2012 | Noda |
| 2013/0004138 A1 | 1/2013 | Kilar |
| 2013/0006469 A1 | 1/2013 | Green |
| 2013/0018534 A1 | 1/2013 | Hilleary |
| 2013/0021148 A1 | 1/2013 | Cook |
| 2013/0030660 A1 | 1/2013 | Fujimoto |
| 2013/0032054 A1 | 2/2013 | Schneider |
| 2013/0046421 A1 | 2/2013 | ElFassi |
| 2013/0048795 A1 | 2/2013 | Cross |
| 2013/0073114 A1 | 3/2013 | Nemat-Nasser |
| 2013/0096731 A1 | 4/2013 | Tamari |
| 2013/0197774 A1 | 8/2013 | Denson |
| 2013/0274950 A1 | 10/2013 | Richardson |
| 2013/0317711 A1 | 11/2013 | Plante |
| 2013/0332004 A1 | 12/2013 | Gompert et al. |
| 2013/0345927 A1 | 12/2013 | Cook |
| 2014/0012438 A1 | 1/2014 | Shoppa |
| 2014/0025225 A1 | 1/2014 | Armitage |
| 2014/0025254 A1 | 1/2014 | Plante |
| 2014/0046550 A1 | 2/2014 | Palmer |
| 2014/0047371 A1 | 2/2014 | Palmer |
| 2014/0052315 A1 | 2/2014 | Isailovski |
| 2014/0098228 A1 | 4/2014 | Plante |
| 2014/0152828 A1 | 6/2014 | Plante |
| 2014/0226010 A1 | 8/2014 | Molin |
| 2014/0257594 A1 | 9/2014 | Hashimoto |
| 2014/0279707 A1 | 9/2014 | Joshua |
| 2014/0280204 A1 | 9/2014 | Avery |
| 2014/0339374 A1 | 11/2014 | Mian |
| 2015/0000415 A1 | 1/2015 | Kelley |
| 2015/0035665 A1 | 2/2015 | Plante |
| 2015/0057836 A1 | 2/2015 | Plante |
| 2015/0105934 A1 | 4/2015 | Palmer |
| 2015/0134226 A1 | 5/2015 | Palmer |
| 2015/0202935 A1 | 7/2015 | Muthusamy |
| 2015/0203116 A1 | 7/2015 | Fairgrieve |
| 2015/0317846 A1 | 11/2015 | Plante |
| 2015/0371462 A1 | 12/2015 | Ramesh |
| 2016/0114820 A1 | 4/2016 | Palmer |
| 2016/0140872 A1 | 5/2016 | Palmer |
| 2016/0200330 A1 | 7/2016 | Palmer |
| 2016/0200333 A1 | 7/2016 | Palmer |
| 2016/0292936 A1 | 10/2016 | Palmer |

FOREIGN PATENT DOCUMENTS

| | | |
|---|---|---|
| CA | 2469728 | 12/2005 |
| CA | 2469728 A1 | 12/2005 |
| CA | 2632689 | 6/2007 |
| CA | 2692415 | 8/2011 |
| CA | 2692415 A1 | 8/2011 |
| DE | 4416991 A1 | 11/1995 |
| DE | 20311262 | 9/2003 |
| DE | 20311262 U1 | 9/2003 |
| DE | 202005008238 | 9/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 5/1998 |
| EP | 1115092 A1 | 7/2001 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 068475375 | 8/2008 |
| EP | 077529295 | 12/2008 |
| EP | 077531838 | 12/2008 |
| EP | 077728129 | 12/2008 |
| EP | 2104075 | 9/2009 |
| GB | 2268608 A | 1/1994 |
| GB | 2402530 | 12/2004 |
| GB | 2402530 A | 12/2004 |
| GB | 2451485 | 2/2009 |
| GB | 2447184 B | 6/2011 |
| GB | 2446994 | 8/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |

(56) References Cited

FOREIGN PATENT DOCUMENTS

| | | |
|---|---|---|
| JP | H05137144 A | 6/1993 |
| JP | 5294188 | 11/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | PCT/US99/01810 | 8/1999 |
| WO | 9962741 | 12/1999 |
| WO | 0007150 A1 | 2/2000 |
| WO | 0028410 A1 | 5/2000 |
| WO | 0048033 | 8/2000 |
| WO | 0077620 | 12/2000 |
| WO | 0123214 | 4/2001 |
| WO | 0125054 | 4/2001 |
| WO | PCT/US99/29382 | 4/2001 |
| WO | 0146710 A2 | 6/2001 |
| WO | 03045514 | 6/2003 |
| WO | 2005095175 A1 | 10/2005 |
| WO | 2005118366 | 12/2005 |
| WO | 2006022824 | 3/2006 |
| WO | 2006022824 A2 | 3/2006 |
| WO | WO2006047042 | 5/2006 |
| WO | 2006125256 | 11/2006 |
| WO | 2006125256 A1 | 11/2006 |
| WO | WO2006047029 | 12/2006 |
| WO | WO2006047055 | 12/2006 |
| WO | WO2007006265 | 3/2007 |
| WO | WO2007006404 | 3/2007 |
| WO | WO2007006536 | 3/2007 |
| WO | 2007067767 | 6/2007 |
| WO | PCT/US07/68325 | 11/2007 |
| WO | PCT/US07/68328 | 11/2007 |
| WO | PCT/US07/68329 | 11/2007 |
| WO | PCT/US07/68331 | 11/2007 |
| WO | PCT/US07/68332 | 11/2007 |
| WO | PCT/US07/68333 | 11/2007 |
| WO | PCT/US07/68334 | 11/2007 |
| WO | PCT/US07/084366 | 11/2007 |
| WO | WO2007083997 | 11/2007 |
| WO | WO2007083998 | 11/2007 |
| WO | PCT/US07/75397 | 2/2008 |
| WO | PCT/US10/22012 | 7/2010 |
| WO | 2011055743 A1 | 5/2011 |
| WO | PCT/US11/22087 | 7/2011 |
| WO | PCT/US12/55063 | 3/2013 |
| WO | PCT/US12/55060 | 4/2013 |
| WO | 2013134615 A1 | 9/2013 |

OTHER PUBLICATIONS

DriveCam, Inc.'s Infringement Contentions Exhibit C, U.S. Pat. No. 7,804,426. Aug. 19, 2011. (47 pgs.).
DriveCam's Disclosure of Asserted Claims and Preliminary Infringement Contentions in DriveCam, Inc. v. SmartDrive Systems, Inc., Case No. 3:11-CV-00997-H-RBB, for the Southern District of California. Aug. 19, 2011. (6 pgs.).
Preliminary Claim Construction and Identification of Extrinsic Evidence of Defendant/Counterclaimant SmartDriveSystems, Inc. in DriveCam, Inc. v. SmartDrive Systems, Inc., Case No. 3:11-CV-00997-H (RBB), for the Southern District of California. Nov. 8, 2011. (13 pgs.).
Supplement to DriveCam's Disclosure of Asserted Claims and Preliminary Infringement Contentions' in DriveCam, Inc. v. SmartDrive Systems, Inc., Case No. 3:11-CV-00997-H-RBB, for the Southern District of California. Oct. 14, 2011. (7 pgs.).
"DriveCam, Inc's Disclosure of Proposed Constructions and Extrinsic Evidence Pursuant to Patent L.R. 4.1.a & 4.1.b" Disclosure and Extrinsic Evidence in DriveCam, Inc. v. SmartDrive Systems, Inc., Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendani/Counterclaimant SmartDrive Systems, Inc." Claim Construction and and Extrinsic Evidence in DriveCam, Inc. v. SmartDrive Systems, Inc., Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 on Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Allowance for U.S. Appl. No. 14/036,299, mailed Mar. 20, 2015, 5 pages.
Notice of Allowance Application for U.S. Appl. No. 11/566,424, mailed Feb. 26, 2010, 6 pages.
Notice of Allowance for U.S. Appl. No. 11/377,164, mailed Dec. 3, 2014, 5 pages.
Notice of Allowance for U.S. Appl. No. 11/377,164, mailed Feb. 13, 2015, 2 pages.
Notice of Allowance for U.S. Appl. No. 11/377,164, mailed Feb. 25, 2014, 2 pages.
Notice of Allowance for U.S. Appl. No. 11/377,164, mailed Nov. 18, 2013, 7 pages.
Notice of Allowance for U.S. Appl. No. 11/377,167, mailed Apr. 1, 2015, 7 pages.
Notice of Allowance for U.S. Appl. No. 11/800,876, mailed Apr. 19, 2012, 8 pages.
Notice of Allowance for U.S. Appl. No. 13/957,810, mailed Jun. 8, 2015, 10 pages.
USPTO Final Office Action for U.S. Appl. No. 11/296,906, mailed Aug. 8, 2012, 15 pages.
USPTO Final Office Action for U.S. Appl. No. 12/096,591, mailed Dec. 5, 2014, 23 pages.
USPTO Final Office Action for U.S. Appl. No. 12/096,591, mailed Jul. 18, 2012, 15 pages.
USPTO Final Office Action for U.S. Appl. No. 12/096,591, mailed Nov. 7, 2013, 14 pages.
USPTO Final Office Action for U.S. Appl. No. 13/957,810, mailed Jun. 27, 2014, 22 pages.
USPTO Final Office Action for U.S. Appl. No. 14/036,299, mailed Feb. 24, 2015, 9 pages.
USPTO Non-Final Office Action for U.S. Appl. No. 11/296,906, mailed Apr. 8, 2014, 19 pages.
USPTO Non-Final Office Action for U.S. Appl. No. 11/296,906, mailed Jun. 12, 2012, 13 pages.
USPTO Non-Final Office Action for U.S. Appl. No. 11/377,164, mailed Apr. 7, 2014, 7 pages.
USPTO Non-Final Office Action for U.S. Appl. No. 11/377,164, mailed Aug. 18, 2014, 5 pages.

(56) References Cited

OTHER PUBLICATIONS

USPTO Non-Final Office Action for U.S. Appl. No. 11/377,164, mailed Sep. 10, 2012, 10 pages.
USPTO Non-Final Office Action for U.S. Appl. No. 11/377,167, mailed Jun. 27, 2013, 11 pages.
USPTO Non-Final Office Action for U.S. Appl. No. 12/096,591, mailed Jun. 14, 2011, 8 pages.
USPTO Non-Final Office Action for U.S. Appl. No. 12/096,591, mailed Mar. 27, 2013, 16 pages.
USPTO Non-Final Office Action for U.S. Appl. No. 13/957,810, mailed Apr. 17, 2015, 6 pages.
USPTO Non-final Office Action for U.S. Appl. No. 13/957,810, mailed Nov. 27, 2013, 18 pages.
Gary A. Rayner, U.S. Appl. No. 09/405,857, filed Sep. 24, 1999.
Jamie Etcheson, U.S. Appl. No. 11/566,424, filed Dec. 4, 2006.
DriveCam, Inc., U.S. Appl. No. 14/070,206, filed Nov. 1, 2013.
USPTO Non-Final Office Action mailed Jan. 4, 2016 in U.S. Appl. No. 14/529,134, filed Oct. 30, 2014 (65 pgs).
Adaptec published and sold its VideoOh! DVD software USB 2.0 Edition in at least Jan. 24, 2003.
Ambulance Companies Use Video Technology to Improve Driving Behavior, Ambulance Industry Journal, Spring 2003.
Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424.
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec.13, 2011, pp. 1-15.
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill, 'DriveCam—FAQ', Dec. 12, 2003.
Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/fiash/articles/vidtemplate_mediapreso_flash8.html.
David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8UNLEASHED (Sams Oct. 12, 2005).
Del Lisk, 'DriveCam Training Handout Ver4', Feb. 3, 2005.
Drivecam, Inc., User's Manual for Drivecam Video Systems' Hindsight 20/20 Software Version 4.0 (2003).
DriveCam, Inc.'s Infringement Contentions Exhibit A, U.S. Pat. No. 6,389,340, Document 34.1, Oct. 20, 2011.
DriveCam, Inc.'s Infringement Contentions Exhibit B, U.S. Pat. No. 7,659,827. Aug. 19, 2011.
DriveCam, Inc.'s Infringement Contentions Exhibit B, U.S. Pat. No. 7,804,426, Document 34.2, Oct. 20, 2011.
DriveCam, Inc.'s Infringement Contentions Exhibit C, U.S. Pat. No. 7,659,827, Document 34.3, Oct. 20, 2011.
DriveCam, Inc.'s Infringement Contentions Exhibit C, U.S. Pat. No. 7,804,426. Aug. 19, 2011.
DriveCam, Inc.'s Infringement Contentions Exhibit D, Document 34.4, Oct. 20, 2011.
DriveCam—Illuminator Data Sheet, Oct. 2, 2004.
Drivecam.com as retrieved by the Internet Wayback Machine as of Mar. 5, 2005.
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011.
DriveCam Driving Feedback System, Mar. 15, 2004.
DriveCam Extrinsic Evidence with Patent LR 4.1 .a Disclosures, Nov. 3, 2011.
DriveCam Extrinsic Evidence with Patent LR 4.1 .a Disclosures, Nov. 8, 2011.
Driver Feedback System, Jun. 12, 2001.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
GE published its VCR User's Guide for Model VG4255 in 1995.
Glenn Oster, 'Hindsight 20/20 v4.0 Software Installation', 1 of 2, Jun. 20, 2003.
Glenn Oster, 'HindSight 20/20 v4.0 Software Installation', 2 of 2, Jun. 20, 2003.
Glenn Oster, 'Illuminator Installation', Oct. 3, 2004.
Hans Fantel, Video; Search Methods Make a Difference in Picking VCR's, NY Times, Aug. 13, 1989.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorys- ub.--Code=coaching)., printed from site on Jan. 11, 2012.
Inovate Motorsports, OT-1 16 Channel OBD-II Interface User Manual, Version 1.0, Nov. 28, 2007, pp. 3, 4, 21 & 27.
Interior Camera Data Sheet, Oct. 26, 2001.
International Search Report and Written Opinion issued in PCT/US07/68325 on Feb. 27, 2008.

(56) References Cited

OTHER PUBLICATIONS

International Search Report and Written Opinion issued in PCT/US07/68328 on Oct. 15, 2007.
International Search Report and Written Opinion issued in PCT/US07/68329 on Mar. 3, 2008.
International Search Report and Written Opinion issued in PCT/US07/68332 on Mar. 3, 2008.
International Search Report and Written Opinion issued in PCT/US07/68334 on Mar. 5, 2008.
International Search Report for PCT/US2006/47055, Mailed Mar. 20, 2008 (2 pages).
International Search Report issued in PCT/US2006/47042 mailed Feb. 25, 2008.
J. Gallagher, 'Lancer Recommends Tech Tool', Insurance and Technology Magazine, Feb. 2002.
Jean (DriveCam vendor), 'DC Data Sheet', Nov. 6, 2002.
Jean (DriveCam vendor), 'DriveCam brochure', Nov. 6, 2002.
Jean (DriveCam vendor), 'Feedback Data Sheet', Nov. 6, 2002.
Jean (DriveCam vendor), 'Hindsight 20-20 Data Sheet', Nov. 4, 2002.
Jessyca Wallace, 'Analyzing and Processing DriveCam Recorded Events', Oct. 6, 2003.
Jessyca Wallace, 'Overview of the DriveCam Program', Dec. 15, 2005.
Jessyca Wallace, 'The DriveCam Driver Feedback System', Apr. 6, 2004.
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.* v. *SmartDrive Systems, Inc.*, Case No. 3:11-Cv-00997-H-RBB, Document 29, filed Oct. 12, 2011, pp. 1-7.
Julie Stevens, 'DriveCam Services', Nov. 15, 2004.
Julie Stevens, 'Program Support Roll-Out & Monitoring', Jul. 13, 2004.
Jung, Sang-Hack, et al., Egomotion Estimation in Monocular Infra-red Image Sequence for Night Vision Applications, IEEE Workshop on Applications of Computer Vision (WACV '07), Feb. 2007, pp. 8-8; Digital Object Identifier 10.1109/WACV.2007.20.
JVC Company of America, JVC Video Cassette Recorder HR-IP820U Instructions (1996).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002.
Karen, 'Managers Guide to the DriveCam Driving Feedback System', Jul. 30, 2002.
Kathy Latus (Latus Design), 'Case Study—Cloud 9 Shuttle', Sep. 23, 2005.
Kathy Latus (Latus Design), 'Case Study—Lloyd Pest Control', Jul. 19, 2005.
Kathy Latus (Latus Design), 'Case Study—Time Warner Cable', Sep. 23, 2005.
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa Mckenna, 'A Fly on the Windshield?', Pest Control Technology Magazine, Apr. 2003.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520.
Passenger Transportation Mode Brochure, May 2, 2005.
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983).
Patent Abstracts of Japan vol. 011, No. 292 (E-543), Sep. 19, 1987 (Sep. 19, 198) & JP 62 091092 A (OK Eng:KK), Apr. 25, 1987 (Apr. 25, 1987).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992).
Patent Abstracts of Japan vol. 017, No. 521 (E-1435), Sep. 20, 1993 (Sep. 20, 1993) & JP 05 137144 A (Kyocera Corp), Jun. 1, 1993 (Jun. 1, 1993).
Patent Abstracts of Japan vol. 1996, No. 09, Sep. 30, 1996 (Sep. 30, 1996) & JP 08 124069 A (Toyota Motor Corp), May 17, 1996 (May 17, 1996).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997).
Patent Abstracts of Japan vol. 1998, No. 02, Jan. 30, 1998 (Jan. 30, 1998) & JP 09 272399 A (Nippon Soken Inc), Oct. 21, 1997 (Oct. 21, 1997).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998).
PCT/US2010/022012, Invitation to Pay Additional Fees with Communication of Partial International Search, Jul. 21, 2010.
Peter G. Thurlow, Letter (including exhibits) Regarding Patent Owner's Response to Initial Office Action in Ex Parte Reexamination, Mar. 27, 2012.
Preliminary Claim Construction and Identification of Extrinsic Evidence of Defendant/Counterclaimant SmartDriveSystems, Inc. in *DriveCam, Inc.* v. *SmartDrive Systems, Inc.*, Case No. 3:11-CV-00997-H (RBB), for the Southern District of California. Nov. 8, 2011.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.

(56) References Cited

OTHER PUBLICATIONS

Ronnie Rittenberry, 'Eyes on the Road', Jul. 2004.
SmartDrives Systems, Inc's Production, SO14246-S014255, Nov. 16, 2011.
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011.
The DriveCam, Nov. 6, 2002.
The DriveCam, Nov. 8, 2002.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167, filed Mar. 16, 2006 entitled, "Vehicle Event Recorder Systems and Networks Having Integrated Cellular Wireless Communications Systems".
USPTO Final Office Action for U.S. Appl. No. 11/297,669, mailed Nov. 7, 2011, 15 pages.
USPTO Final Office Action for U.S. Appl. No. 13/957,810, mailed Jun. 27, 2014, 24 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Nov. 6, 2009, 9 pages.
USPTO Non-Final Office Action for U.S. Appl. No. 11/297,669, mailed Apr. 28, 2011, 11 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Nov. 19, 2007, 7 pages.
USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 12/096,591, mailed May 20, 2014, 19 pages.
USPTO Non-Final Office Action for U.S. Appl. No. 14/036,299, mailed Aug. 12, 2014.
USPTO Non-Final Office Action for U.S. Appl. No. 11/296,907, Mailed Mar. 22, 2007 ( 17 pages).
USPTO Non-final Office Action mailed Aug. 27, 2009 during prosecution of U.S. Appl. No. 11/566,424.
USPTO Non-Final Office Action mailed Nov. 27, 2013 in U.S. Appl. No. 13/957,810, filed Aug. 2, 2013.
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).

World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011.
Written Opinion issued in PCT/US07/68328 on Oct. 15, 2007.
Written Opinion of the International Searching Authority for PCT/US2006/47042. Mailed Feb. 25. 2008 (5 pages).
Written Opinion of the International Searching Authority for PCT/US2006/47055, Mailed Mar. 20, 2008 (5 pages).
Mortlock, "Automatic Train Control: Concept of System," Jun. 28, 2010 Retrieved from http://ww.hsr.ca.gove/docs/programs/eir_memos/Proj_Guidelines_TM3_3_1R00.pdf (64 pages).
PCT International Search Report and Written Opinion for PCT/US2015/066873, dated Feb. 19, 2016 (17 pages).
PCT International Search Report and Written Opinion for PCT/US2016/012757 dated Mar. 18, 2016 (7 pages).
European Search Report EP16150325.5 dated May 19, 2016 (13 pages).
Gary A. Rayner, U.S. Appl. No. 09/020,700, filed Feb. 9, 1998.
Gary A. Rayner, U.S. Appl. No. 09/405,857, filed Sep. 24, 1999 .
Gary A. Rayner, U.S. Appl. No. 09/611,891, filed Jul. 7, 2000.
Gary A. Rayner, U.S. Appl. No. 09/669,449, filed Sep. 25, 2000.
Gary A. Rayner, U.S. Appl. No. 09/732,813, filed Dec. 11, 2000.
Charlie Gunderson, U.S. Appl. No. 11/382,222, filed May 8, 2006.
Charlie Gunderson, U.S. Appl. No. 11/382,239, filed May 9, 2006.
Charlie Gunderson, U.S. Appl. No. 11/382,325, filed May 9, 2006.
Charlie Gunderson, U.S. Appl. No. 11/382,328, filed May 9, 2006.
David Stanley, U.S. Appl. No. 11/465,765, filed Aug. 18, 2006.
Larry Richardson, U.S. Appl. No. 11/467,486, filed Aug. 25, 2006.
Craig Denson, U.S. Appl. No. 11/467,694, filed Aug. 28, 2006.
Carl Miller, U.S. Appl. No. 11/566,526, filed Dec. 4, 2006.
Jamie Etcheson, U.S. Appl. No.11/566.424, filed Dec. 4, 2006.
Jamie Etcheson, U.S. Appl. No. 11/566,539, filed Dec. 4, 2006.
Bryan Cook, U.S. Appl. No. 12/359,787, filed Jan. 26, 2009.
Bryon Cook, U.S. Appl. No. 12/691,639, filed Jan. 21, 2010.
Bryon Cook, U.S. Appl. No. 12/793,362, filed Jun. 3, 2010.
Bryon Cook, U.S. Appl. No. 12/814,117, filed Jun. 11, 2010.
Charlie Gunderson, U.S. Appl. No. 13/234,103, filed Sep. 15, 2011.
Syrus C. Nemat-Nasser, U.S. Appl. No. 13/235,263, filed Sep. 16, 2011.
Roni Tamari, U.S. Appl. No. 13/271,417, filed Oct. 12, 2011.
Bryan Cook, U.S. Appl. No. 13/586,750, filed Aug. 15, 2012.
Craig Denson, U.S. Appl. No. 13/736,709, filed Jan. 8, 2013.
Bryon Cook, U.S. Appl. No. 13/923,130, filed Jun. 20, 2013.
DriveCam, Inc., U.S. Appl. No. 13/914,339, filed Jun. 10, 2013.
DriveCam, Inc., U.S. Appl. No. 14/027,038, filed Sep. 13, 2013.
Larry Richardson, U.S. Appl. No. 13/448,725, filed Apr. 17, 2012.
DriveCam, Inc., U.S. Appl. No. 14/034,296, filed Sep. 23, 2013.
Joshua Donald Botnen, U.S. Appl. No. 13/222,301, filed Aug. 31, 2011.
DriveCam Inc., U.S. Appl. No. 14/070,206, filed Nov. 1, 2013.
DriveCam, Inc., U.S. Appl. No. 90/011,951, filed Oct. 11, 2011.
DriveCam, Inc., U.S. Appl. No. 95/001,779, filed Oct. 11, 2011.
James Plante, U.S. Appl. No. 11/296,906, filed Dec. 8, 2005.
James Plante, U.S. Appl. No. 12/096,591, filed Oct. 3, 2008.
James Plante, U.S. Appl. No. 11/296,907, filed Dec. 8, 2005.
James Plante, U.S. Appl. No. 12/096,592, filed Oct. 3, 2008.
James Plante, U.S. Appl. No. 13/734,800, filed Jan. 4, 2013.
James Plante, U.S. Appl. No. 11/297,669, filed Dec. 8, 2005.
James Plante, U.S. Appl. No. 11/377,157, filed Mar. 16, 2006.
James Plante, U.S. Appl. No. 11/377,164, filed Mar. 16, 2006.
James Plante U.S. Appl. No. 11/377,167, filed Mar. 16, 2006.
James Plante, U.S. Appl. No. 11/593,659, filed Nov. 7, 2006.
James Plante, U.S. Appl. No. 13/568,151, filed Aug. 7, 2012.
James Plante, U.S. Appl. No. 13/570,283, filed Aug. 9, 2012.
James Plante, U.S. Appl. No. 11/593,682, filed Nov. 7, 2006.
James Plante, U.S. Appl. No. 11/637,754, filed Dec. 13, 2006.
James Plante, U.S. Appl. No. 11/800,876, filed May 8, 2007.
James Plante, U.S. Appl. No. 13/539,312, filed Jun. 30, 2012.
James Plante, U.S. Appl. No. 11/298,069, filed Dec. 9, 2005.
James Plante, U.S. Appl. No. 13/957,810, filed Aug. 2, 2013.
James Plante, U.S. Appl. No. 11/299,028, filed Dec. 9, 2005.
Jason Palmer, U.S. Appl. No. 14/076,511, filed Nov. 11, 2013.

(56) References Cited

OTHER PUBLICATIONS

Jason Palmer, U.S. Appl. No. 14/055,833, filed Oct. 16, 2013.
Jason Palmer, U.S. Appl. No. 14/186,416, filed Feb. 21, 2014.
James Plante, U.S. Appl. No. 14/036,299, filed Sep. 25, 2013.
James Plante, U.S. Appl. No. 14/177,047, filed Feb. 10, 2014.
DriveCam, Inc., U.S. Appl. No. 95/001,781, filed Oct. 11, 2011.
DriveCam, Inc., U.S. Appl. No. 95/001802, filed Nov. 3, 2011.

* cited by examiner

RAIL VEHICLE EVENT DETECTION AND RECORDING SYSTEM

FIELD

This disclosure relates to a system and method for detecting and recording rail vehicle events.

BACKGROUND

Typically, trains are not equipped with vehicle event detection systems. Some trains are equipped with cameras but these cameras are usually only used for surveillance purposes to monitor interior passenger compartments. The cameras are not connected to mechanical and/or safety subsystems of the train in any way.

SUMMARY

One aspect of the disclosure relates to a rail vehicle event detection system for detecting and recording rail vehicle events. The rail vehicle event detection system may be configured to be coupled with a rail vehicle. In some implementations, the rail vehicle event detection system may be electrically isolated from the rail vehicle. In some implementations, the system may include one or more of an operator identity system, a camera, a transceiver, a sensor, a backup power system, electronic storage, a processor, a user interface, and/or other components.

Operator identity information may be received by the operator identity system. The operator identity information may identify periods of time that individual operators operate the rail vehicle. In some implementations, receiving operator identity information may include receiving entry and/or selection of the operator identity information from operators of the rail vehicle at the rail vehicle. In some implementations, receiving operator identity information may include receiving the operator identity information from a remotely located computing device. In some implementations, receiving operator identity information may include receiving operator identity information from a biometric sensor configured to generate output signals that convey biometric information that identifies an individual operator of the rail vehicle.

Visual information may be acquired by one or more cameras. The visual information may represent a rail vehicle environment. The rail vehicle environment may include spaces in and around an interior and an exterior of the rail vehicle. The visual information may include views of exterior sides of the rail vehicle that capture visual images of events (e.g., collisions, near collisions, etc.) that occur at or near the sides of the rail vehicle, views of interior compartments of the rail vehicle, and/or other visual information. In some implementations, visual information representing the rail vehicle environment at or near ends of the rail vehicle may be acquired. In some implementations, the visual information may be received from a third party camera and/or digital video recorder (DVR) system. For example, such systems may include Panorama, a system previously installed in the rail vehicle, and/or other systems. Visual information may be received from a third party camera and or DVR system wirelessly and/or via wires.

Output signals may be generated by one or more sensors. The output signals may convey operation information related to operation and/or context of the rail vehicle. In some implementations, the output signals may convey information related to mechanical and/or safety subsystems of the rail vehicle. The output signals that convey information related to safety subsystems of the rail vehicle may include overspeed sensor information and/or other information, for example. In some implementations, the output signals may convey operation information related to operation of the rail vehicle at or near both ends of the rail vehicle. In some implementations, the output signals may convey information related to the environment around railcars of the rail vehicle. For example, such output signals may include information from a communications based train control (CBTC) system and/or other external signals received from third party rail safety products.

The processor may be configured to execute computer program components. The computer program components may include an event detection component, a storage component, a communication component, and/or other components.

Rail vehicle events may be detected by the event detection component. The rail vehicle events may be detected based on the output signals and/or other information. Electronic storage of rail vehicle event information may be facilitated by the storage component. The vehicle event information may be stored for a period of time that includes the rail vehicle event. The rail vehicle event information may include the operator identity information, the visual information, and the operation information for the period of time that includes the rail vehicle event.

Wireless communication of the rail vehicle event information may be facilitated by the communication component (e.g., via the transceiver). Wireless communication may be facilitated via the transceiver and/or wireless communication components configured to transmit and receive electronic information. In some implementations, the rail vehicle event information may be wirelessly communicated to a remote computing device via the wireless communication components, for example.

The system may be electrically isolated from the rail vehicle via an opto-isolator, an optical isolation circuit, and/or other isolation components. The opto-isolator may transfer electrical signals between two isolated circuits (e.g., a rail vehicle circuit and a rail vehicle event detection system circuit) using light. The opto-isolator may prevent unexpectedly high voltages in one circuit from being transferred to and/or damaging another circuit. The opto-isolator may couple an input current to an output current via a beam of light modulated by the input current. The opto-isolator may convert an input current signal into a light signal, send the light signal across a dielectric channel, capture the light signal on an output side of the dielectric channel, and then transform the light signal back into an electric signal (e.g., an output current).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
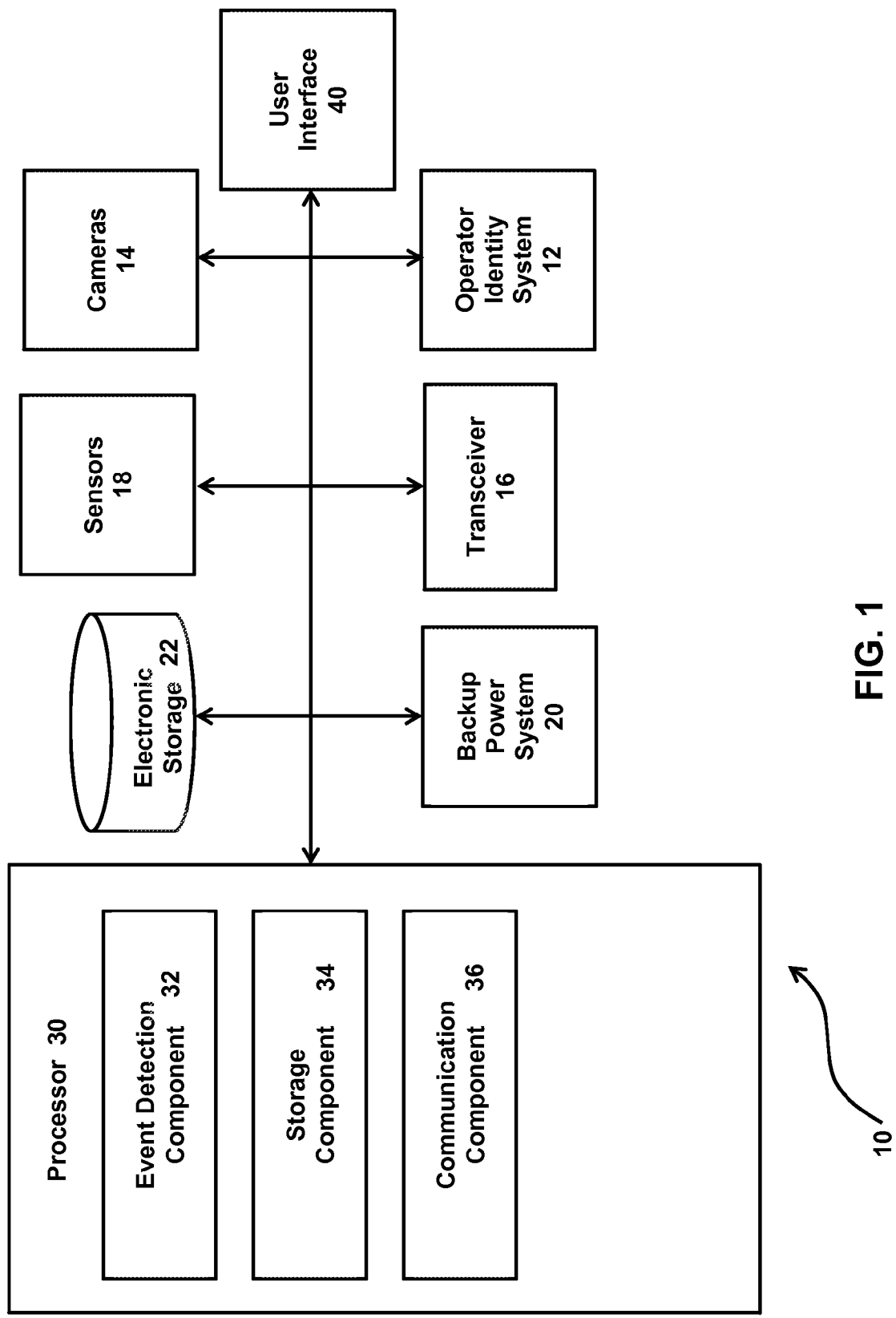
FIG. 1 illustrates a system configured to detect and record rail vehicle events.

FIG. 1 illustrates a system 10 configured to detect and record rail vehicle events. In some implementations, system 10 may include one or more of an operator identity system 12, a camera 14, a transceiver 16, a sensor 18, a backup power system 20, electronic storage 22, a processor 30, a user interface 40, and/or other components. System 10 is configured to be coupled with a rail vehicle. System 10 may be configured to monitor operation of the rail vehicle and/or determine whether rail vehicle events occur. By way of a non-limiting example, rail vehicle events may include collisions with other vehicles and/or pedestrians, near collisions, a specific behavior and/or driving maneuver performed by a rail vehicle operator (e.g., unsafe backing, unsafe braking, unsafe railroad crossing, unsafe turning, operating the rail vehicle with hands off of the control lever and/or any other similar maneuver such as operating the rail vehicle without a foot on a foot controller (for example), passing a signal bar, passing red over red, failure to yield to pedestrians, failure to yield to vehicles, speeding, not checking mirrors, not scanning the road/tracks ahead, not scanning an intersection, operating a personal electronic device, intercom responds, being distracted while eating, drinking, reading, etc., slingshotting, following or not following a transit agency's standard operating procedure), penalty stops, activation of a specific rail vehicle safety system (such as a track brake and/or an emergency brake), train operating parameters (e.g., speed) exceeding threshold values, improper stops at stations, and/or other rail vehicle events. Responsive to determining that a rail vehicle event has occurred, system 10 may be configured to record rail vehicle event information and/or transmit the recorded rail vehicle event information to one or more remotely located computing devices (e.g., wirelessly and/or via wires). The rail vehicle event information may include visual images of the environment about the rail vehicle (e.g., the exterior of the rail vehicle, streets surrounding rail tracks, passenger compartments, operator compartments, etc.), sensor information generated by rail vehicle system sensors and/or aftermarket sensors installed as part of system 10 (e.g., sensors 18), operator information, and/or other information.

Figure 2A:
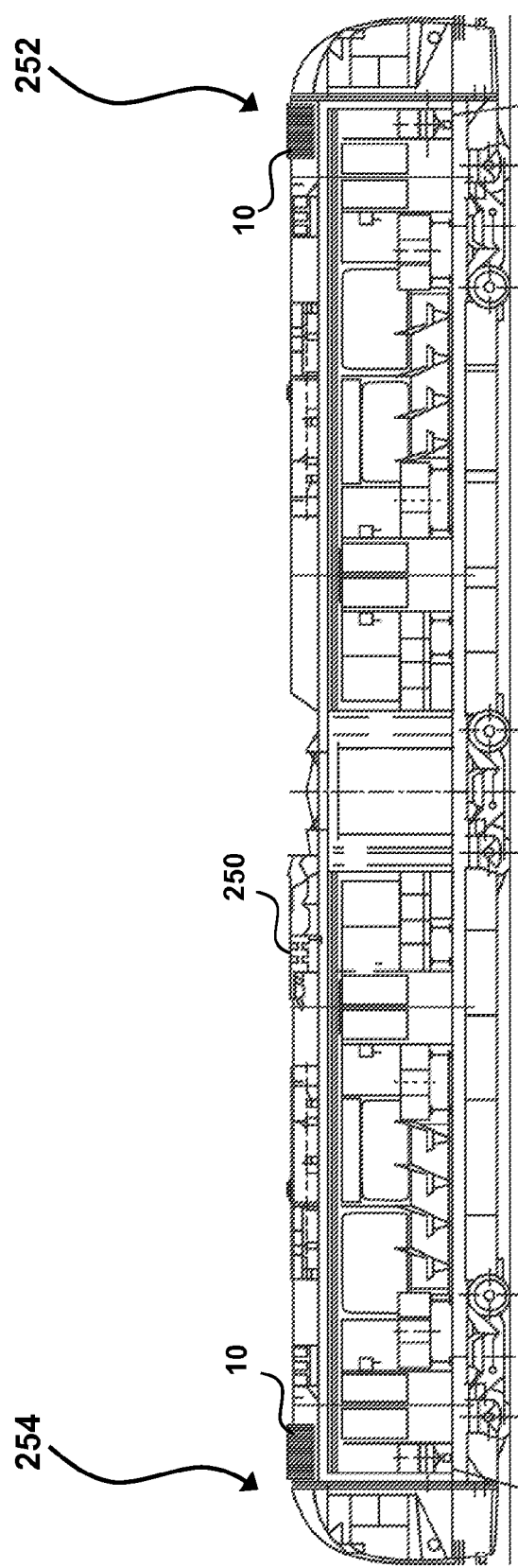
FIG. 2A illustrates the system and/or individual components of the system coupled with a rail vehicle at two locations.

In some implementations, system 10 and/or individual components of system 10 may be coupled with a rail vehicle at one or more locations on and/or within the rail vehicle. For example, FIG. 2A illustrates system 10 and/or individual components of system 10 coupled with a rail vehicle 250 at two locations 252 and 254 at or near the ends of the rail vehicle. This is not intended to be limiting. In some implementations, system 10 and/or individual components of system 10 may be coupled with rail vehicle 250 at any number of locations. In some implementations, system 10 may be coupled with rail vehicle 250 in locations that facilitate communication with one or more subsystems of rail vehicle 250.

Figure 2B:
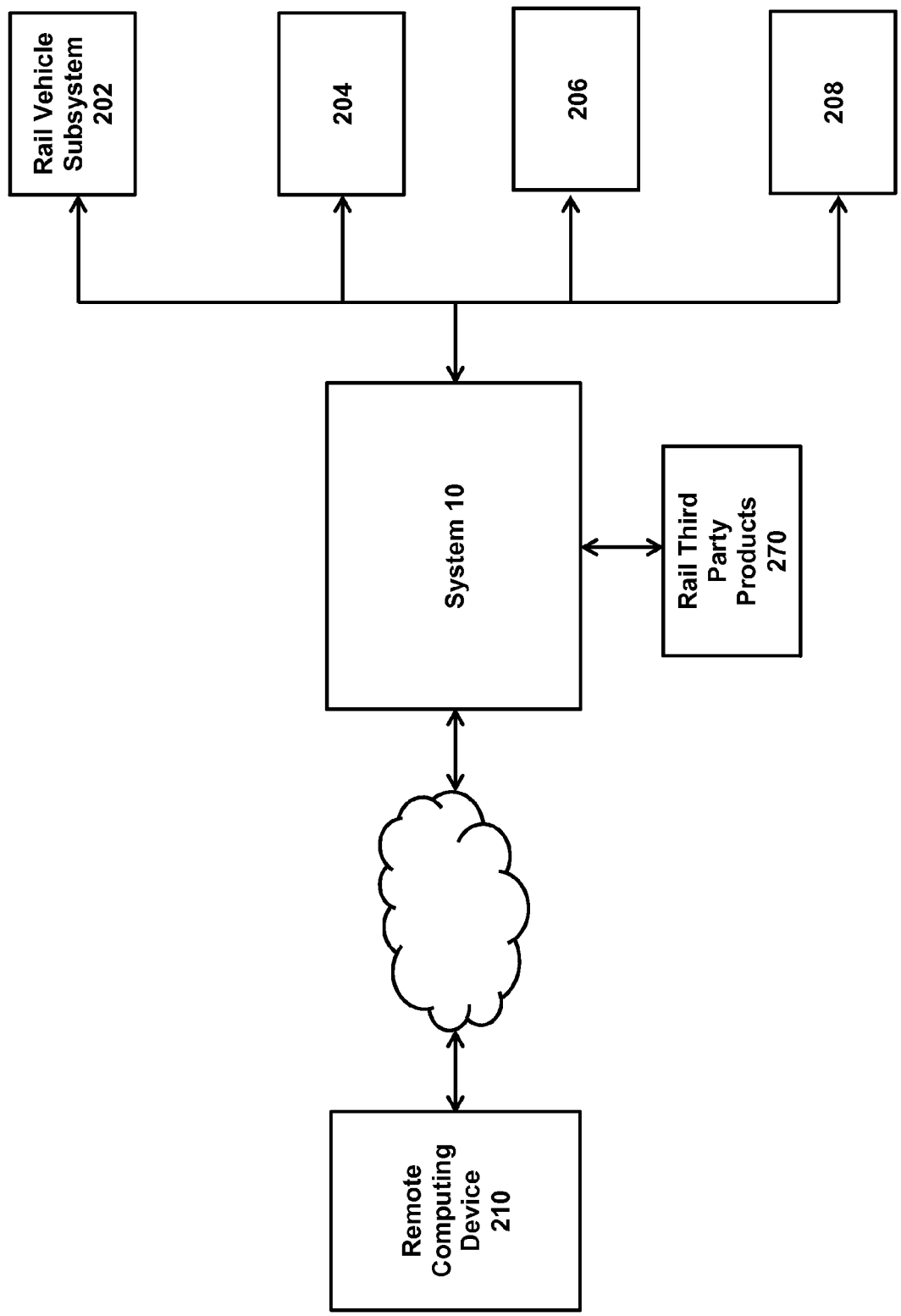
FIG. 2B illustrates the system in communication with rail vehicle subsystems and a remote computing device.

For example, FIG. 2B illustrates system 10 in communication with rail vehicle subsystems 202, 204, 206, and 208. Rail vehicle subsystems may include mechanical subsystems, vehicle safety subsystems, track safety subsystems, inter-railcars safety subsystems, camera subsystems, DVR subsystems, and/or other rail vehicle subsystems (further described below related to sensors 18). System 10 may be configured to be coupled with the rail vehicle subsystems so that information may be transmitted wirelessly and/or system 10 may be physically coupled with the rail vehicle subsystems via wires and/or other physical couplings. As shown in FIG. 2B, system 10 may be configured to communicate (e.g., wirelessly and/or via wires) with one or more remote computing devices 210. System 10 may communicate information (e.g., rail vehicle event information and/or other information) to remote computing device 210 and/or receive information from remote computing device 210 (e.g., information related to settings and/or other control of system 10, and/or other information.)

In some implementations, system 10 may be configured to communicate with other rail third part products 270 (DVR systems, safety systems, etc.). For example, system 10 may be configured to be physically coupled with a rail third party DVR system. As another example, system 10 may be configured to communicate with a CBTC safety system via a physical coupling. In some implementations, system 10 may be configured to communicate information to and/or receive information from third party products 270 wirelessly and/or via wires.

Remote computing device 210 may include one or more processors, a user interface, electronic storage, and/or other components. Remote computing device 210 may be configured to enable a user to interface with system 10, and/or provide other functionality attributed herein to remote computing device 210. Remote computing device 210 may be configured to communicate with system 10 via a network such as the internet, cellular network, Wi-Fi network, Ethernet, and other interconnected computer networks. Remote computing device 210 may facilitate viewing and/or analysis of the information conveyed by output signals of sensors 18 (FIG. 1), information determined by processor 30 (FIG. 1), information stored by electronic storage 22 (FIG. 1), and/or other information. By way of non-limiting example, remote computing device 210 may include one or more of a server, a server cluster, desktop computer, a laptop computer, a handheld computer, a tablet computing platform, a NetBook, a Smartphone, a gaming console, and/or other computing platforms.

As described above, in some implementations, remote computing device 210 may be and/or include a server. The server may include communication lines and/or ports to enable the exchange of information with a network, processor 30 of system 10, and/or other computing platforms. The server may include a plurality of processors, electronic storage, hardware, software, and/or firmware components operating together to provide the functionality attributed herein to remote computing device 210. For example, the server may be implemented by a cloud of computing platforms operating together as a system server.

Returning to FIG. 1, operator identity system 12 may be configured to receive operator identity information that identifies periods of time individual operators operate the rail vehicle. In some implementations, operator identity system 12 may be coupled with the rail vehicle and may be configured to receive entry and/or selection of the operator identity information from operators of the rail vehicle at the rail vehicle. For example, a rail vehicle operator may key in a specific identification code via a user interface located in the rail vehicle. In some implementations, operator identity system 12 may be configured to receive the operator identity information from a remotely located computing device (e.g., remote computing device 210 shown in FIG. 2B). In some implementations, the operator identity information may be received via a third party hardware platform configured (e.g., via software) to transmit the operator identity information to system 10.

In some implementations, operator identity system 12 may be configured to receive operator identity information from a biometric sensor configured to generate output signals that convey biometric information that identifies an individual operator of the rail vehicle. In some implementations, the biometric sensor may be worn by the operator. For example, such biometric sensors may include fingerprint scanning sensors, iris scanning sensors, sensors that generate output signals related to an electroencephalogram (EEG) of the operator used to uniquely identify the operator, sensors that generate output signals related to an electrocardiogram (ECG) of the operator used to uniquely identify the operator, sensors that generate output signals related to brain waves of the operator used to uniquely identify the operator, and/or other biometric sensors.

Cameras 14 may be configured to acquire visual information representing a rail vehicle environment. Any number of individual cameras 14 may be positioned at various locations on and/or within the rail vehicle. The rail vehicle environment may include spaces in and around an interior and/or an exterior of the rail vehicle. Cameras 14 may be configured such that the visual information includes views of exterior sides of the rail vehicle, interior compartments of the rail vehicle, and/or other areas to capture visual images of activities that occur at or near the sides of the rail vehicle, in front of and/or behind the rail vehicle, within the rail vehicle, on streets surrounding rail vehicle tracks, and/or in other areas. In some implementations, cameras 14 may include multiple cameras positioned around the rail vehicle and synchronized together to provide a 360 degree and/or other views of the inside of one or more portions of the rail vehicle (e.g., a driver compartment, a passenger compartment) and/or a 360 degree and/or other views of the outside of the vehicle (e.g., at or near a leading end of the rail vehicle looking ahead toward upcoming traffic, street crossings, etc.). In some implementations, the visual information may be received from a third party camera and/or digital video recorder (DVR) system. For example, such systems may include Panorama, a system previously installed in the rail vehicle, and/or other systems. Visual information may be received from a third party camera and or DVR system wirelessly and/or via wires.

Transceiver 16 may comprise wireless communication components configured to transmit and receive electronic information. In some implementations, processor 30 may be configured to facilitate wireless communication of rail vehicle event information to a remote computing device (e.g., remote computing device 210) via transceiver 16 and/or other wireless communication components. Transceiver 16 may be configured to transmit and/or receive encoded communication signals. Transceiver 16 may include a base station and/or other components. In some implementations, transceiver 16 may be configured to transmit and receive signals via one or more radio channels of a radio link. In some implementations, transceiver 16 may be configured to transmit and receive communication signals substantially simultaneously. Transmitting and/or receiving communication signals may facilitate communication between remote computing device 210 (FIG. 2B) and processor 30, for example.

Sensors 18 may be configured to generate output signals conveying operation information related to operation and/or context of the rail vehicle and/or other information. Information related to the operation of vehicle 12 may include feedback information from one or more subsystems of the rail vehicle, and/or other information. The subsystems may include, for example, the engine, the drive train, lighting systems (e.g., headlights, brake lights, train status indicator lights, track information lighting/signage), the braking system, power delivery (e.g., mechanical and/or electrical) systems, safety systems, radio systems, dispatch systems, and/or other subsystems. The subsystems of the rail vehicle may include one or more mechanical sensors, electronic sensors, and/or other sensors that generate output signals. In some implementations, sensors 18 may include at least one sensor that is a rail vehicle subsystem sensor associated with mechanical systems of the rail vehicle (e.g., the engine, drive train, lighting, braking, power delivery systems, etc). In some implementations, sensors 18 may include at least one sensor that is a rail vehicle subsystem sensor associated with a rail vehicle safety system configured to generate output signals conveying information related to safety systems of the rail vehicle. Rail vehicle safety subsystem sensors may include automatic train protection (ATP) sensors (e.g., ATP bypass active, ATP overspeed sensors), an automatic train control system (ATCS), track switches, track brake sensors, emergency brake sensors, intercom call sensors, a high horn sensor, a slingshotting sensor (e.g., a sensor that conveys output signals that indicate whether a side to side g-force at a last rail car when the rail car speed is too high causes passenger discomfort, has the potential to cause derailment, an/or may cause damage to the rail car and/or the track), and/or other sensors.

Information related to the context of the rail vehicle may include information related to the environment in and/or around the rail vehicle. The vehicle environment may include spaces in and around an interior and an exterior of the rail vehicle. The information related to the context of the rail vehicle may include information related to movement of the rail vehicle, an orientation of the rail vehicle, a geographic position of the rail vehicle, a spatial position of the rail vehicle relative to other objects, a tilt angle of rail vehicle, and/or other information. In some implementations, the output signals conveying the information related to the context of the rail vehicle may be generated via non-standard aftermarket sensors installed in the rail vehicle and/or other sensors. The non-standard aftermarket sensor may include, for example, a video camera (e.g., cameras 14), a microphone, an accelerometer, a gyroscope, a geolocation sensor (e.g., a GPS device), a radar detector, a magnetometer, radar, biometric sensors, an intercom, an active safety sensor that utilizes a camera such as Mobile Eye and/or Bendex, and/or other sensors. In some implementations, the output signals may include information from a communications based train control (CBTC) system and/or other external signals received from third party rail safety products.

Although sensors 18 are depicted in FIG. 1 as a single element, this is not intended to be limiting. Sensors 18 may include one or more sensors located adjacent to and/or in communication with the various mechanical systems of the rail vehicle, adjacent to and/or in communication with the various safety systems of the rail vehicle, in one or more positions (e.g., at or near the front/rear of the rail vehicle) to accurately acquire information representing the vehicle environment (e.g. visual information, spatial information, orientation information), and/or in other locations. For example, in some implementations, system 10 may be configured such that a first sensor is located in a driver compartment of the rail vehicle near operational control used to operate the rail vehicle and a second sensor is located on top of the rail vehicle and is in communication with a geolocation satellite. In some implementations, sensors 18 are configured to generate output signals substantially continuously during operation of the rail vehicle.

One or more components of system 10 may be electrically coupled with the rail vehicle such that the one or more components of system 10 may be powered by electrical power from the rail vehicle. The one or more components of system 10 may be individually electrically coupled to the rail vehicle and/or the components of system 10 may be electrically coupled to the rail vehicle via common electrical connection. Backup power system 20 may be configured to provide electrical power to system 10 responsive to power received by the system 10 from the rail vehicle ceasing. (Power from the rail vehicle may cease for various reasons such as turning the rail vehicle ignition off, mechanical malfunctions, criminal activity, and/or other events where it would be advantageous for system 10 to continue to operate). Power system 20 may be configured to power operator identity system 12, cameras 14, transceiver 16, sensors 18, processor 30, user interface 40, electronic storage 22, and/or other components of system 10. Power system 20 may comprise one or more power sources connected in series and/or in parallel. In some implementations, power system 20 may be rechargeable. Power system 20 may be recharged via an AC power source, a rail vehicle power source, a USB port, a non-contact charging circuit, and/or other recharging methods. Examples of power sources that may be included backup power system 20 include one or more DC batteries, Lithium Ion and/or Lithium Polymer Cells, Nickel Metal Hydride, and/or other power sources.

Electronic storage 22 may be configured to store electronic information. Electronic storage 22 may comprise electronic storage media that electronically stores information. The electronic storage media of electronic storage 22 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22 may store software algorithms, recorded video event data, information determined by processor 30, information received via user interface 40, and/or other information that enables system 10 to function properly. Electronic storage 22 may be (in whole or in part) a separate component within system 10, or electronic storage 22 may be provided (in whole or in part) integrally with one or more other components of system 10 (e.g., user interface 40, processor 30, etc.).

Processor 30 may be configured to provide information processing capabilities in system 10. As such, processor 30 may comprise one or more of a digital processor, an analog processor, a digital circuit designed to process information, an analog circuit designed to process information, a state machine, and/or other mechanisms for electronically processing information. Although processor 30 is shown in FIG. 1 as a single entity, this is for illustrative purposes only. In some implementations, processor 30 may comprise a plurality of processing units. These processing units may be physically located within the same device, or processor 30 may represent processing functionality of a plurality of devices operating in coordination.

Processor 30 may be configured to execute one or more computer program components. The computer program components may comprise one or more of an event detection component 32, a storage component 34, a communication component 36, and/or other components. Processor 30 may be configured to execute components 32, 34, and/or 36 by software; hardware; firmware; some combination of software, hardware, and/or firmware; and/or other mechanisms for configuring processing capabilities on processor 30. It should be appreciated that although components 32, 34, and 36 are illustrated in FIG. 1 as being co-located within a single processing unit, in implementations in which processor 30 comprises multiple processing units, one or more of components 32, 34, and/or 36 may be located remotely from the other components. The description of the functionality provided by the different components 32, 34, and/or 36 described herein is for illustrative purposes, and is not intended to be limiting, as any of components 32, 34, and/or 36 may provide more or less functionality than is described. For example, one or more of components 32, 34, and/or 36 may be eliminated, and some or all of its functionality may be provided by other components 32, 34, and/or 36. As another example, processor 30 may be configured to execute one or more additional components that may perform some or all of the functionality attributed below to one of components 32, 34, and/or 36.

Event detection component 32 may be configured to detect rail vehicle events based on the output signals from sensors 18 and/or other information. In some implementations, event detection component 32 may determine one or more rail vehicle parameters based on the output signals and/or other information. In some implementations, event detection component 32 may determine rail vehicle parameters that are not directly measurable by sensors 18. In some implementations, event detection component 32 may be configured to determine one or more rail vehicle parameters one or more times in an ongoing manner during operation of the rail vehicle. Event detection component 32 may be configured to detect rail vehicle events based on the information conveyed by the output signals generated by sensors 18, the rail vehicle parameters, pre-determined rail vehicle event criteria, and/or based on other information. A specific rail vehicle event may be detected based on the sensor information, the determined parameters, and the obtained vehicle event criteria by comparing the information conveyed by the output signals and/or the determined vehicle parameters to rail vehicle event criteria sets such that a first rail vehicle event is detected responsive to the output signals and/or the determined parameters satisfying one or more individual criteria in a first criteria set associated with a first vehicle event.

Storage Component 34 may be configured to facilitate electronic storage of rail vehicle event information for a period of time that includes the rail vehicle event. The rail vehicle event information may be stored in non-transient electronic storage 22, electronic storage included in remote computing device(s) 210 (FIG. 2B), and/or in other locations. The rail vehicle event information may include the visual information from one or more cameras 14, the operation information from one or more sensors 18 for the period of time that includes the rail vehicle event, operator identity information, and/or other information. In some implementations, storage component 34 may be configured such that operator identity information for the period of time that includes the rail vehicle event is included in the rail vehicle event information. In some implementations, storage component 34 may be configured to synchronize the operator identity information, the visual information, the operation information, and/or other information with respect to time. For example, visual information from various cameras 14 may be synchronized with information conveyed by the output signals from various sensors 18 by storage component 34.

Communication component 36 may be configured to facilitate wireless communication of information conveyed by the output signals, the determined parameters, the rail vehicle event information, and/or other information to remote computing device 210 (FIG. 2B) and/or other devices. Communication component 36 may be configured to facilitate communication via one or more of a WiFi network, a cellular network, an Ethernet network, and/or other network communication solutions. Communication component 36 may be configured such that a user of system 10 may choose one communication solution to start with and, without changing the hardware of system 10, change the solution to any other available communication solution any time the user requests a change. Communication component 36 may be configured to facilitate communication responsive to the detection of a rail vehicle event. Communication component 36 may be configured to facilitate communication in real-time or near real-time. For example, communication component 36 may facilitate one or more individual communications during operation of the rail vehicle. Individual communications may be responsive to a detected rail vehicle event and may occur just after detection of an individual rail vehicle event. In some implementations, communication component 36 may be configured to facilitate communication after use of the rail vehicle has ceased such that the information conveyed by the output signals, the determined parameters, rail vehicle event information, and/or other information is communicated in a single communication. In some implementations, communication component 36 may be configured to associate visual and/or other information in the output signals of the one or more cameras 14 with information related to operation and/or context of the vehicle (e.g., vehicle subsystem sensors and/or aftermarket sensors 18).

User interface 40 may be configured to provide an interface between system 10 and users through which the users may provide information to and receive information from system 10. This enables pre-determined profiles, criteria, data, cues, results, instructions, and/or any other communicable items, collectively referred to as "information," to be communicated between a user and one or more of processor 30, sensors 18, remote computing device 210 (shown in FIG. 2B), operator identity system 12, cameras 14, electronic storage 22, backup power system 20, rail vehicle subsystems 202-208 (shown in FIG. 2B), and/or other components of system 10. In some implementations, all and/or part of user interface 40 may be included in remote computing device 210, operator identity system 12, and/or other components of system 10. In some implementations, user interface 40 may be included in a housing with one or more other components (e.g., processor 30) of system 10.

Examples of interface devices suitable for inclusion in user interface 40 comprise a keypad, buttons, switches, a keyboard, knobs, levers, a display screen, a touch screen, speakers, a microphone, an indicator light, an audible alarm, a printer, a tactile feedback device, and/or other interface devices. In one implementation, user interface 40 comprises a plurality of separate interfaces. In some implementations, user interface 40 comprises at least one interface that is provided integrally with processor 30 and/or electronic storage 22.

It is to be understood that other communication techniques, either hard-wired or wireless, are also contemplated by the present disclosure as user interface 40. In some implementations, user interface 40 may be included in a removable storage interface provided by electronic storage 22. In this example, information may be loaded into system 10 wirelessly from a remote location (e.g., via a network), from removable storage (e.g., a smart card, a flash drive, a removable disk, etc.), and/or other sources that enable the user(s) to customize the implementation of system 10. Other exemplary input devices and techniques adapted for use with system 10 as user interface 40 comprise, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as user interface 40.

User interface 40, communication component 36, remote computing device 210 (FIG. 2B) and/or other components of system 10 may be configured to facilitate review of the rail vehicle event information and/or communication with an operator of the rail vehicle. In some implementations, the review and/or communication may be facilitated in real time or near real time to provide feedback to an operator about his performance. For example, a remotely located reviewer may review rail vehicle event information recently transmitted (e.g., by communication component 36 via transceiver 16) to remote computing device 210. The remote reviewer may look for behaviors such as unsafe backing, unsafe braking, unsafe railroad crossing, unsafe turning, operating the vehicle with hands and/or feet off of a control lever, passing a signal bar, passing red over red, failure to yield to pedestrians, failure to yield to vehicles, speeding, not checking mirrors, not scanning the road/tracks ahead, not scanning an intersection, operating a personal electronic device, being distracted by eating/drinking/reading/etc., improper stops at stations, speeding, following too close behind another train, and/or other dangerous behaviors. Based on his review of the driver's technique, the reviewer may send a message back to the rail vehicle operators which the rail vehicle operator may receive via user interface 40, for example. In some implementations, communication component 36, remote computing device 210 and/or other components of system 10 may be configured to facilitate automatic analysis of rail vehicle event information and alert (e.g., via text message, email, a phone call, via an indicator displayed by user interface 40, etc.) reviewers, rail vehicle operators, and/or other users.

Figure 3:
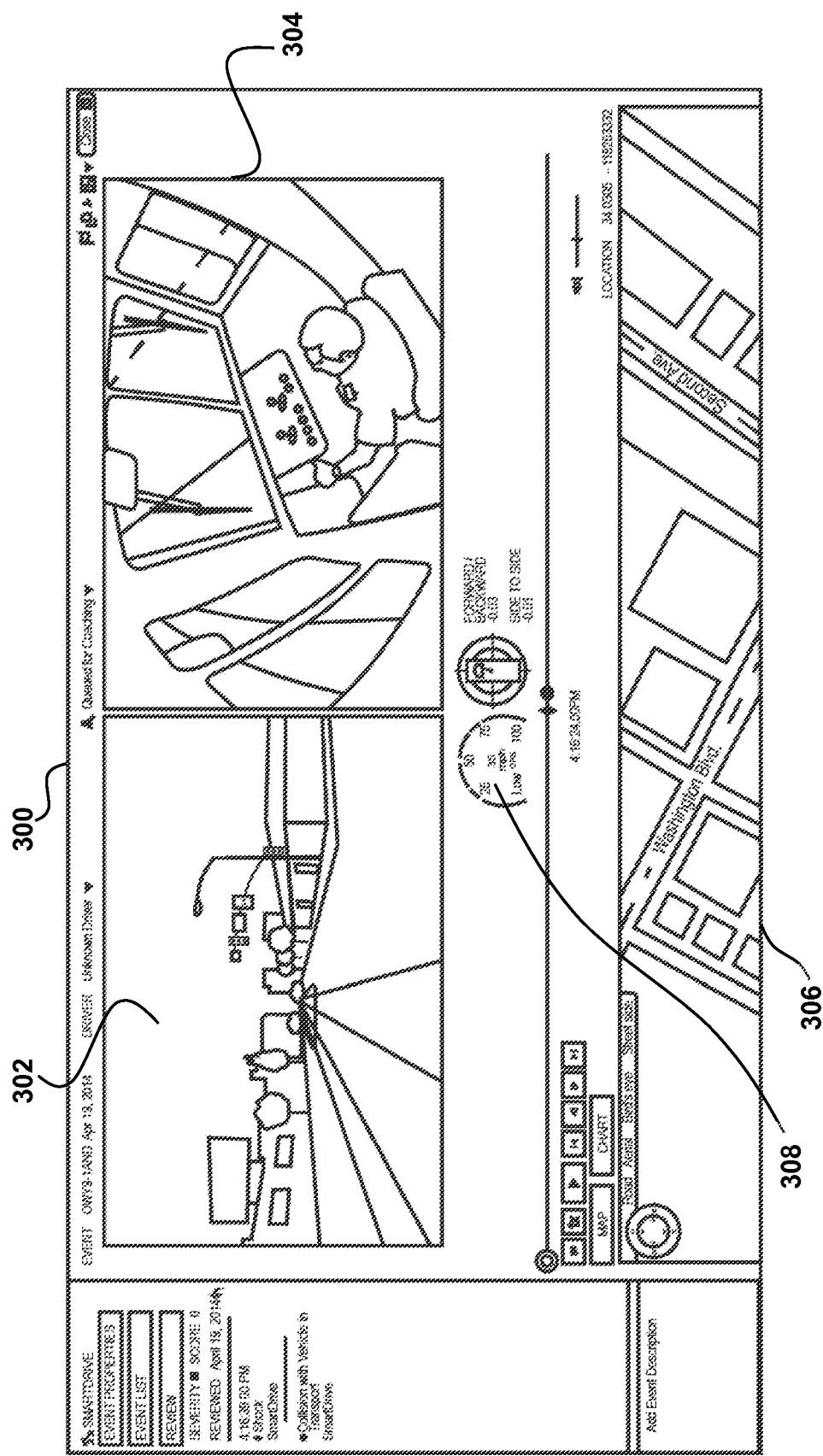
FIG. 3 illustrates an example view of a graphical user interface presented to the reviewer via a remote computing device.

FIG. 3 illustrates an example view 300 of a graphical user interface presented to the reviewer via remote computing device 210 (FIG. 2B), for example. View 300 includes a forward looking camera field 302, a driver camera field 304, a map field 306, rail vehicle subsystems information fields 308, and/or other fields. These fields may facilitate review of the operator's performance and/or other information before, during, and/or after a rail vehicle event, and/or at other times. FIG. 3 is not intended to be limiting. The graphical user interface may include any number of views and/or fields. The graphical user interface may be presented to a reviewer via user interface 40. As described above, some or all of user interface 40 may be included in remote computing device 210 and/or the rail vehicle.

Figure 4A:
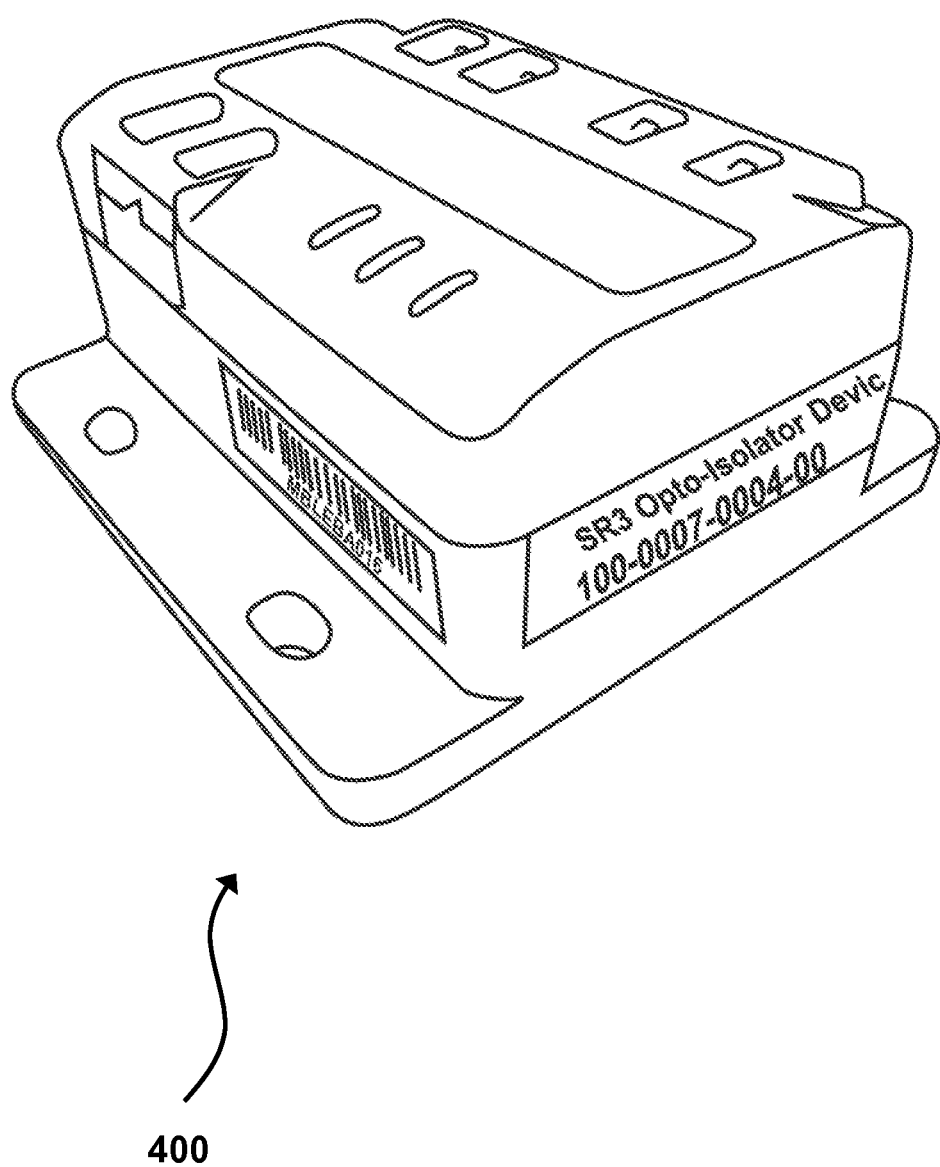
FIG. 4A illustrates an opto-isolator.
Figure 4B:
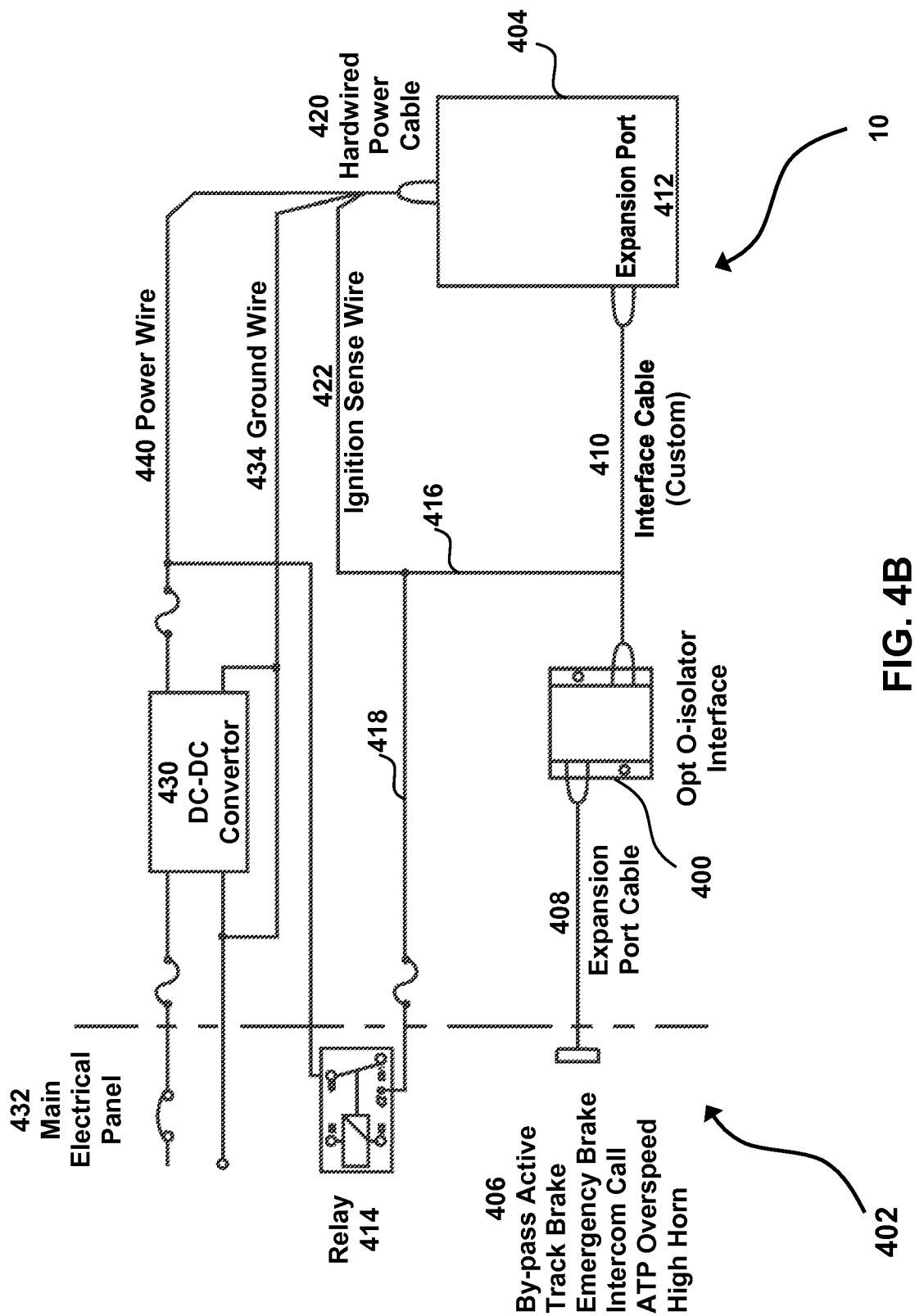
FIG. 4B illustrates an isolation circuit.

In some implementations, system 10 may be electrically isolated from the rail vehicle. System 10 may be electrically isolated from the rail vehicle via an opto-isolator, an optical isolation circuit, and/or other isolation components. An opto-isolator 400 is illustrated in FIG. 4A. As shown in FIG. 4A, opto-isolator 400 may be a stand-alone component within system 10. An isolation circuit 402 is illustrated in FIG. 4B. As shown in FIG. 4B, opto-isolator 400 may be electrically coupled to one or more safety systems 406 of the rail vehicle via an expansion port cable 408. Opto-isolator 400 may be electrically coupled to a housing 404 that houses one or more components of system 10 via a custom interface cable 410 and/or an expansion port 412. In some implementations, custom interface cable 410 may be electrically coupled to a relay 414 via coupling wires 416, 418. Housing 404 may be coupled to a hardwired power cable 420 (separately from expansion port 412). Hardwired power cable 420 may be electrically coupled with relay 414 via an ignition sense wire 422 and/or coupling wire 418. (In some implementations ignition sense wire and coupling wire 418 may be the same wire.) Hardwired power cable 420 may be electrically coupled with a negatively charged portion of a main electrical panel 432 of the rail vehicle and/or a DC-DC converter 430 via a ground wire 434. Hardwired power cable 420 may be electrically coupled with a positively charged portion of main electrical panel 432 and/or converter 430 via a power wire 440.

Referring to FIGS. 4A and 4B, opto-isolator 400 may transfer electrical signals between two isolated circuits (e.g., a rail vehicle circuit and a rail vehicle event detection system circuit) using light. Opto-isolator 400 may prevent unexpectedly high voltages in one circuit (e.g., the rail vehicle circuit) from being transferred to and/or damaging another circuit (e.g., the rail vehicle event detection system circuit). Opto-isolator 400 may couple an input current to an output current via a beam of light modulated by the input current. Opto-isolator 400 may convert the input current signal into a light signal, send the light signal across a dielectric channel, capture the light signal on an output side of the dielectric channel, and then transform the light signal back into an electric signal (e.g., an output current).

In some implementations, opto-isolator 400 may be configured to provide multiple (e.g., six) inputs driving a corresponding number (e.g., 6) optically isolated outputs. One of the inputs may provide a time delay function that requires the input signal to remain present for a minimum number (e.g., 5) of seconds before the signal is output to expansion port 412. The time delay may be enabled or disabled via a printed circuit board (PCB) jumper. When disabled, the input may function identically to the other (e.g., five) inputs. Inputs may present as high as practical impedance for the rail vehicle source signals, whether powered or not. Power to drive the inputs may be supplied by the rail vehicle. By way of a non-limiting example, voltages between about 5V and about 50V may be considered a high signal. Inputs below about 2V may be considered a low signal. Inputs may include a selectable 3× attenuator to increase noise margins if necessary. Inputs may provide about 100V transient protection. Outputs may be optically isolated from the inputs. Output power may be provided by the same power source (e.g., a rail vehicle power source) that drives other components of system 10. Output states may mimic the input states (e.g., high in=high out). The output circuit may provide a minimum of about 7 volts with about a 5 mA load in the high state to ensure proper operation of expansion port 412.

Figure 5:
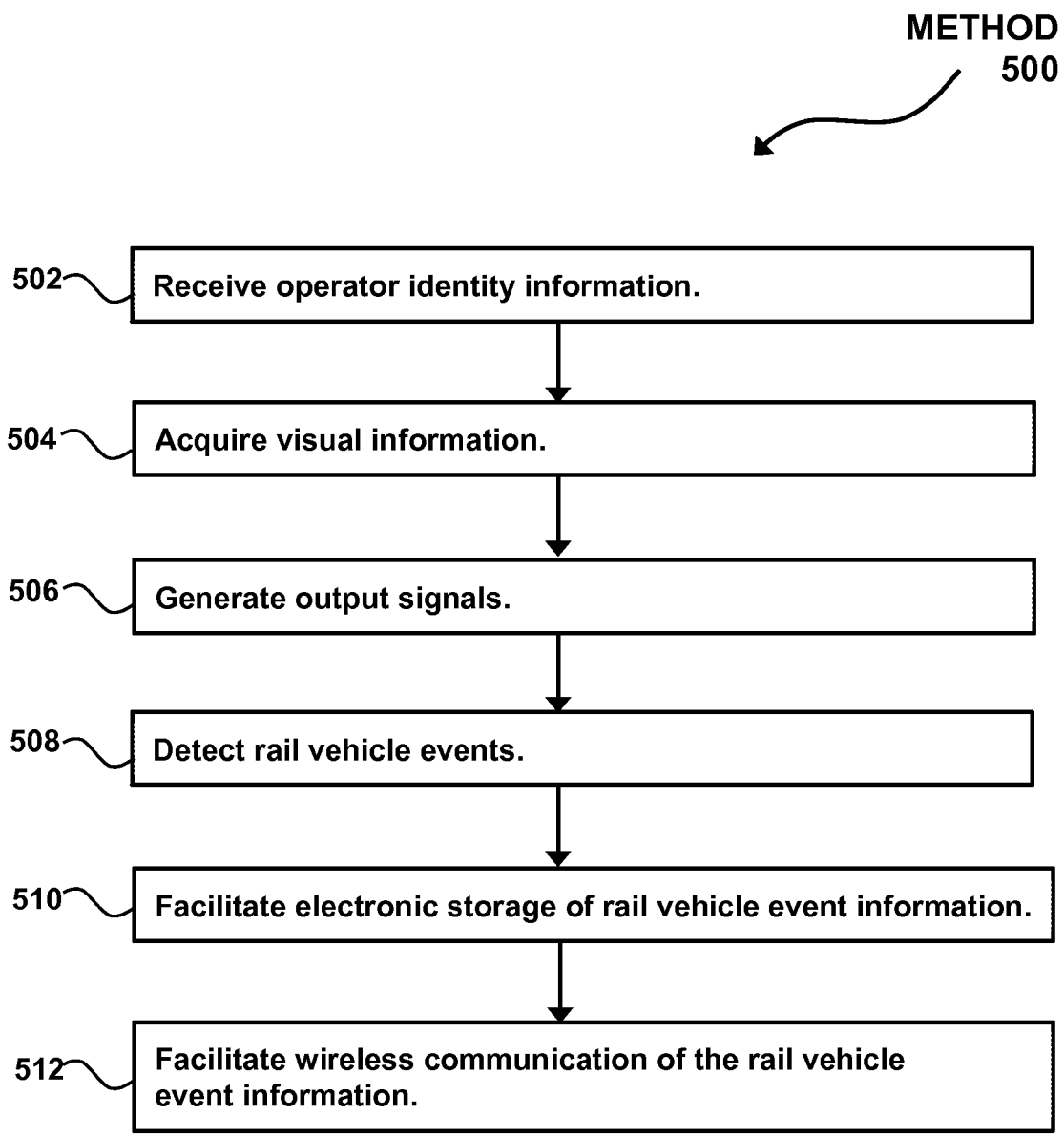
FIG. 5 illustrates a method for detecting and recording rail vehicle events.

FIG. 5 illustrates a method 500 for detecting and recording rail vehicle events. The rail vehicle events may be detected and recorded with a rail vehicle event detection system configured to be coupled with a rail vehicle. In some implementations, the rail vehicle event detection system may be electrically isolated from the rail vehicle (e.g., via an opto-isolator). The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on one or more electronic storage mediums. The one or more processing devices may include one or more devices configured through hardware, firmware, and/or software to be specifically designed for execution of one or more of the operations of method 500.

At an operation 502, operator identity information may be received. The operator identity information may identify periods of time that individual operators operate the rail vehicle. In some implementations, receiving operator identity information may include receiving entry and/or selection of the operator identity information from operators of the rail vehicle at the rail vehicle. In some implementations, receiving operator identity information may include receiving the operator identity information from a remotely located computing device. In some implementations, receiving operator identity information may include receiving operator identity information from a biometric sensor configured to generate output signals that convey biometric information that identifies an individual operator of the rail vehicle. In some implementations, operation 502 may be performed by one or more operator identity systems the same as or similar to operator identity system 12 (shown in FIG. 1 and described herein).

At an operation 504, visual information may be acquired. The visual information may represent a rail vehicle environment. The rail vehicle environment may include spaces in and around an interior and an exterior of the rail vehicle. The visual information may include views of exterior sides of the rail vehicle that capture visual images of collisions that occur at the sides of the rail vehicle, passengers entering and/or exiting the rail vehicle, wheelchair loading and/or offloading, and/or other visual information. In some implementations, visual information representing the rail vehicle environment at or near both ends of the rail vehicle may be acquired. In some implementations, operation 504 may be performed by one or more cameras the same as or similar to cameras 14 (shown in FIG. 1 and described herein).

At an operation 506, output signals may be generated. The output signals may convey operation information related to operation of the rail vehicle. In some implementations, the output signals convey information related to safety systems of the rail vehicle. The output signals that convey information related to safety systems of the rail vehicle may include overspeed sensor information and/or other information. In some implementations, the output signals may convey operation information related to operation of the rail vehicle at or near both ends of the rail vehicle. In some implementations, the output signals may be communicated via wires and/or wirelessly using WiFi, Bluetooth, radio signals, a wireless network such as the internet and/or a cellular network, and/or other communication techniques. In some implementations, operation 506 may be performed by one or more sensors the same as or similar to sensors 18 (shown in FIG. 1 and described herein).

At an operation 508, rail vehicle events may be detected. The rail vehicle events may be detected based on the output signals and/or other information. In some implementations, operation 508 may be performed by a processor component the same as or similar to event detection component 32 (shown in FIG. 1 and described herein).

At an operation 510, electronic storage of rail vehicle event information may be facilitated. The vehicle event information may be stored for a period of time that includes the rail vehicle event. The rail vehicle event information may include the visual information and the operation information for the period of time that includes the rail vehicle event. In some implementations, operation 510 may be performed by a processor component the same as or similar to storage component 34 (shown in FIG. 1 and described herein).

At an operation 512, wireless communication of the rail vehicle event information may be facilitated. Wireless communication may be facilitated via wireless communication components configured to transmit and receive electronic information. In some implementations, the rail vehicle event information may be wirelessly communicated to a remote computing device via the wireless communication components. In some implementations, operation 512 may be performed by a processor component the same as or similar to communication component 36 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A rail vehicle event detection system configured to be coupled with a rail vehicle, the system comprising:
one or more cameras configured to acquire visual information representing a rail vehicle environment, the rail vehicle environment including spaces in and around an interior and an exterior of the rail vehicle;
one or more sensors configured to generate output signals conveying operation information related to operation of the rail vehicle;
non-transient electronic storage configured to store electronic information;
one or more physical computer processors configured by computer readable instructions to:
detect rail vehicle events based on the output signals; and
facilitate electronic storage of rail vehicle event information for a period of time that includes the rail vehicle event in the non-transient electronic storage, the rail vehicle event information including the visual information from the one or more cameras and the operation information from the one or more sensors for the period of time that includes the rail vehicle event; and
a power system configured to provide electrical power to the rail vehicle event detection system responsive to electrical power received by the rail vehicle event detection system from the rail vehicle ceasing.

2. The system of claim 1, further comprising an operator identity system configured to receive operator identity information that identifies periods of time individual operators operate the rail vehicle, wherein the one or more physical computer processors are configured such that operator identity information for the period of time that includes the rail vehicle event is included in the rail vehicle event information.

3. The system of claim 2, wherein the operator identity system is coupled with the rail vehicle and is configured to receive entry and/or selection of the operator identity information from operators of the rail vehicle at the rail vehicle.

4. The system of claim 2, wherein the operator identity system is configured to receive the operator identity information from a remotely located computing device.

5. The system of claim 2, wherein the operator identity system is configured to receive operator identity information from a biometric sensor configured to generate output signals that convey biometric information that identifies an individual operator of the rail vehicle.

6. The system of claim 1, wherein the one or more cameras are configured such that the visual information includes views of exterior sides of the rail vehicle to capture visual images of collisions that occur at the sides of the rail vehicle.

7. The system of claim 1, further comprising wireless communication components configured to transmit and receive electronic information, wherein the one or more physical computer processors are configured to facilitate wireless communication of the rail vehicle event information to a remote computing device via the wireless communication components.

8. The system of claim 1, wherein the one or more sensors are configured such that at least one of the one or more sensors is a rail vehicle subsystem sensor associated with mechanical systems of the rail vehicle, the at least one sensor configured to generate output signals conveying information related to the mechanical systems of the vehicle.

9. The system of claim 1, wherein the one or more sensors are configured such that at least one of the one or more sensors is a rail vehicle subsystem sensor associated with a rail vehicle safety system, the at least one sensor configured to generate output signals conveying information related to safety systems of the rail vehicle.

10. The system of claim 9, wherein the one or more sensors are configured such that the at least one rail vehicle subsystem sensor associated with the rail vehicle safety system is one or more of an overspeed sensor, a track brake sensor, an intercom sensor, a high horn sensor, an emergency brake sensor, or a CBTC sensor.

11. A rail vehicle event detection system configured to be coupled with a rail vehicle, the system comprising:
one or more cameras configured to acquire visual information representing a rail vehicle environment, the rail vehicle environment including spaces in and around an interior and an exterior of the rail vehicle;
one or more sensors configured to generate output signals conveying operation information related to operation of the rail vehicle;
non-transient electronic storage configured to store electronic information; and
one or more physical computer processors configured by computer readable instructions to:
detect rail vehicle events based on the output signals; and
facilitate electronic storage of rail vehicle event information for a period of time that includes the rail vehicle event in the non-transient electronic storage, the rail vehicle event information including the visual information from the one or more cameras and the operation information from the one or more sensors for the period of time that includes the rail vehicle event,
wherein the rail vehicle event detection system is electrically isolated from the rail vehicle.

12. The system of claim 1, wherein the one or more one or more cameras are configured to acquire visual information representing the rail vehicle environment at or near both ends of the rail vehicle; and
wherein the one or more sensors are configured to generate output signals conveying operation information related to operation of the rail vehicle at or near both ends of the rail vehicle.

13. A method for detecting and recording rail vehicle events with a rail vehicle event detection system configured to be coupled with a rail vehicle, the method comprising:
acquiring visual information representing a rail vehicle environment, the rail vehicle environment including spaces in and around an interior and an exterior of the rail vehicle;
generating output signals conveying operation information related to operation of the rail vehicle;
detecting rail vehicle events based on the output signals; and
facilitating electronic storage of rail vehicle event information for a period of time that includes the rail vehicle event in non-transient electronic storage, the rail vehicle event information including the visual information and the operation information for the period of time that includes the rail vehicle event,
wherein the rail vehicle event detection system is electrically isolated from the rail vehicle.

14. The method of claim 13, further comprising receiving operator identity information that identifies periods of time individual operators operate the rail vehicle, wherein the operator identity information for the period of time that includes the rail vehicle event is included in the rail vehicle event information.

15. The method of claim 14, further comprising receiving entry and/or selection of the operator identity information from operators of the rail vehicle at the rail vehicle.

16. The method of claim 14, further comprising receiving the operator identity information from a remotely located computing device.

17. The method of claim 14, further comprising receiving operator identity information from a biometric sensor configured to generate output signals that convey biometric information that identifies an individual operator of the rail vehicle.

18. The method of claim 13, wherein the visual information includes views of exterior sides of the rail vehicle to capture visual images of collisions that occur at the sides of the rail vehicle.

19. The method of claim 13, wherein the output signals convey information related to safety systems of the rail vehicle.

20. The method of claim 19, wherein the output signals that convey information related to safety systems of the rail vehicle include one or more of overspeed sensor information, track brake sensor information, intercom sensor information, high horn sensor information, emergency brake sensor information, or CBTC sensor information.

21. The method of claim 13, wherein the rail vehicle event detection system is electrically isolated from the rail vehicle by an opto-isolator.

22. The method of claim 13, further comprising acquiring visual information representing the rail vehicle environment at or near both ends of the rail vehicle; and
generating output signals conveying operation information related to operation of the rail vehicle at or near both ends of the rail vehicle.

23. The system of claim 11, wherein the rail vehicle event detection system is electrically isolated from the rail vehicle via an opto-isolator.

* * * * *